May 24, 1949.  J. W. MILLINGTON ET AL  2,470,828
TUBE TESTING APPARATUS
Filed Jan. 10, 1946
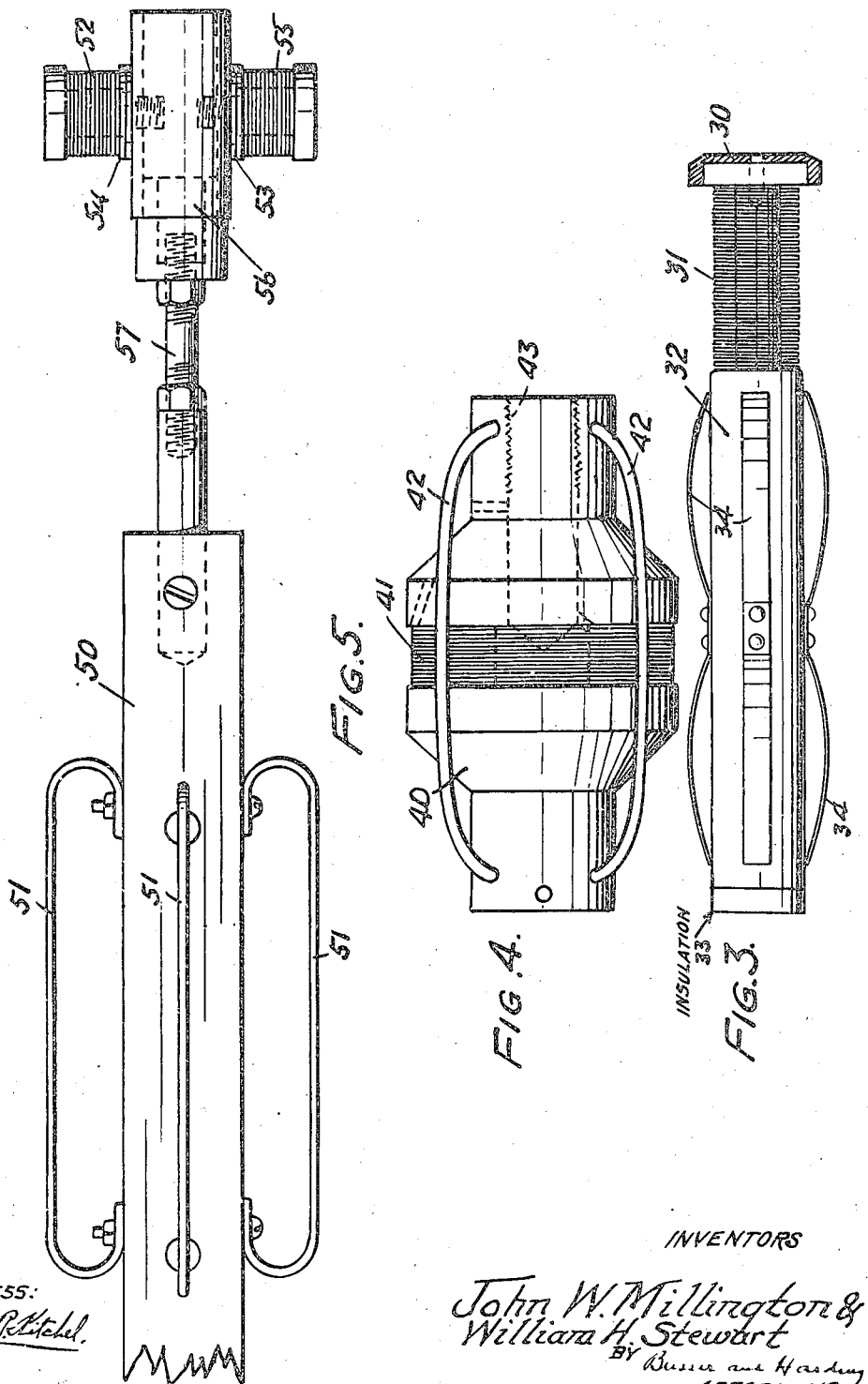
INVENTORS
John W. Millington &
William H. Stewart Patented May 24, 1949

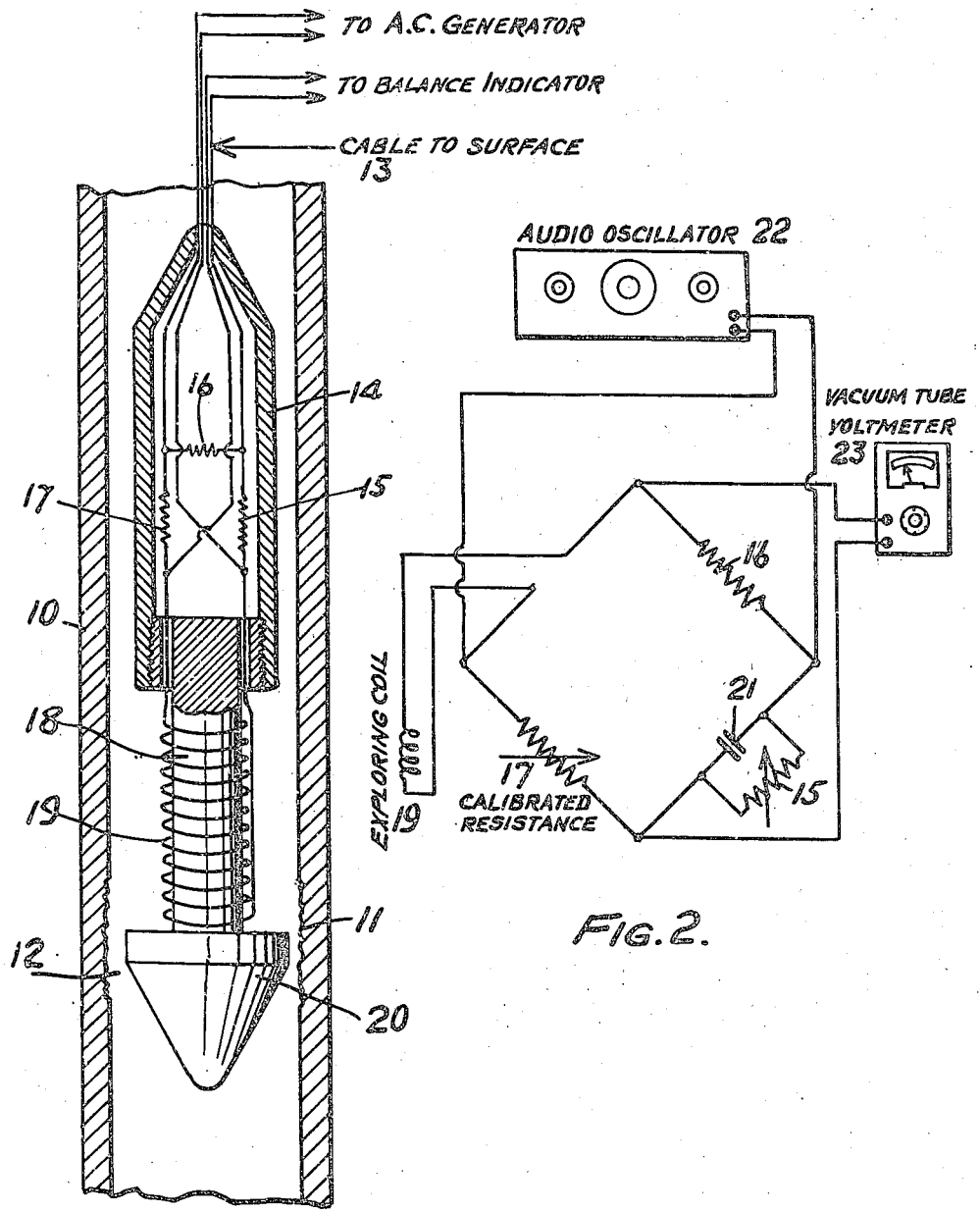

2,470,828

UNITED STATES PATENT OFFICE 2,470,828

TUBE TESTING APPARATUS

John W. Millington and William H. Stewart, Beaumont, Tex., assignors to Sun Oil Company, Philadelphia, Pa., a corporation of New Jersey Application January 10, 1946, Serial No. 640,343

1 Claim. (Cl. 175—183)

This invention relates to a method and apparatus for calipering and indicating variations of internal surface configurations or diameter of well tubing, piping or the like and more particularly to an electro-magnetically operated form of device.

It is a principal object of this invention to provide a method and apparatus for indicating variations of internal surface configurations or diameter of well tubing that is electro-magnetically responsive to surface irregularities and hence does not require the use of feeler or indicator mechanisms for sensing the variations to be indicated.

It is known that oil well tubing is continuously subjected to corrosion for a variety of reasons and that such corrosion sometimes becomes so bad as to cause the tubing to fail without any previous warning. In order that oil well tubing now in use may be examined periodically to determine the extent of corrosion and hence the degree of internal surface pitting or variation of internal diameter due to the effects of corrosion it is the practice to lower into the tubing or conduits under examination a calipering device that will indicate and record such variations as the device passes through the tubing by the mechanical actuation of surface feelers or indicators. It is to avoid the use of mechanical feelers and linkage that the present invention has been devised. In general, an exploring coil is utilized which is lowered into the tubing to be examined and will without contacting physically the surface of tubing walls give an accurate indication of localized variations of internal surface configuration or variations in the diameter of the tubing.

It is also a particular object of this invention to provide an indicating device including an A. C. bridge circuit wherein the exploring coil is one leg of the bridge together with means for balancing the bridge circuit for a given condition of tubing which is to be examined and means for indicating the unbalance of the bridge circuit due to variations in the condition of the tubing from the given condition.

Further objects and advantages of this invention will be apparent by reference to the following specification and drawing in which:

Figure 1 is a longitudinal section of a portion of well tubing containing one form of the calipering device of this invention.

Figure 2 is a schematic diagram of the indicating bridge circuit including the exploring coil for use with the device of this invention, Figure 3 is a side elevation of a modified form of search coil, and Figures 4 and 5 are side elevations of two additional modified forms of search coils.

Referring to Figure 1 of the drawings, a section of well tubing 10 is shown as having corrosion pits 11 and 12 which are exemplary of corroded areas and which are to be indicated by the calipering device of this invention. Suspended within the well tubing 10 by the cable 13 is the calipering device comprised of the tubular housing 14 which contains the resistance elements 15, 16 and 17 for the indicating A. C. bridge circuit. Removably held in the lower end of the housing 14 is a magnetic core 18 about which an exploring coil 19 is wound and the end lower pole 20 of the magnetic core 18 is suitably shaped as shown to properly proportion the magnetic field so that the sensitivity of the device to variations of internal surface configuration for the tubing being examined may be increased. The cable 13 also carries the electrical wiring to supply the alternating current to the input of the bridge circuit as well as the wiring to connect the unbalanced bridge voltage output to a suitable indicating meter (not shown in Fig. 1) to be referred to later.

The exploring coil 19 is connected as an impedance leg in the A. C. bridge including resistances 15, 16 and 17 in a manner shown in detail by Figure 2 of the drawings. As shown in that figure, resistances 15 and 17 are of the adjustable rheostat type adapting the bridge to be suitably balanced for a given condition. A condenser 21 of desired value is connected to shunt resistance 15 in the bridge leg opposite the exploring coil 19 to effectively balance out the inductive reactance of the exploring coil 19 in the bridge circuit as is done in the Maxwell Bridge circuit. The input of the bridge circuit is supplied with alternating current from a variable frequency source such as an audio oscillator 22. It has been found that a frequency of 1250 cycles per second is satisfactory for operating the device. The unbalanced voltage output from the bridge circuit is connected to a suitable meter type of indicator such as an A. C. vacuum tube voltmeter indicated at 23.

In operating the calipering device as described the following method may be employed. The exploring coil is placed within a section of tubing of known condition without any corrosion effects such as pitting or the like. The bridge circuit is then balanced by adjusting resistances 15 and 17 and it is a preferable method of this invention to set the bridge slightly off the balance point in such direction that a small voltage output is obtained and that the vacuum tube voltmeter will read up-scale for an increase in diameter of the tubing causing an increased voltage output. The search coil is then lowered into the tubing to be examined and variations in diameter due to corrosion pitting or the like will cause a change in the reluctance of the magnetic field of the exploring coil. This change in reluctance causes a change in the inductive reactance and hence the effective impedance of the search coil 19 which thus unbalances the bridge in such manner as will be indicated by the A. C. voltmeter 23.

Figure 3 of the drawings is a detailed elevation of a modified form of search coil to be used with the bridge circuit of Figure 2. The pole piece 30 and coil 31 are attached to one end of a tubular body member 32 which is fastened at the other end to any suitable means (not shown) for lowering the coil within the well tubing. It is preferable to insulate the connection at 33. A plurality of leaf spring members 34 are radially disposed about the tubular body member 32 in order to properly center the exploring coil within the tubing to be examined.

In Figure 4 a still further modified form of exploring coil is shown to be comprised of the metal pole pieces and body member 40 on which is wound the coil 41. Centering springs 42 are radially disposed as shown and the body member is provided with the threaded aperture 43 for fastening to a cable or the like.

The modified form of exploring coil shown in Figure 5 is adapted to be lowered into the tubing to be examined on the end of a wooden pole 50, preferably having a square cross section. Radially disposed about the pole 50 are the centering spring members 51. In this modification the exploring coil is wound in two sections 52 and 55 and its axis is supported at right angles to the axis of the pipe to be examined. The iron cores 54 and 53 are magnetically connected through the iron cylinder 56 to which they are bolted. Thus opposite magnetic poles are obtained at opposite ends of the coil. The cylinder 56 is fastened by the stud 57 to the end of the wooden pole 50. With this form of the invention it is possible to rotate the pole 50 and orient the axis of the exploring coil with a particular defect in the tubing to be examined to thus obtain a greater sensitivity of the device. When such use of the coil is contemplated it is desirable to know the relative position of the axis of the coil with respect to one of the square sides of the pole 50 in order that an indication of the axial direction of the coil within the tubing may be obtained and to this end suitable indications may be placed on one of the squared sides of the pole 50.

What we claim and desire to protect by Letters Patents is:

A device adapted to be used in magnetically exploring well tubing which comprises a Wheatstone bridge, a housing for receiving three resistance coils of said bridge, a magnetic core having an upper pole and a lower pole, said magnetic core having its upper pole removably secured to the lower end of said housing, an exploring coil surrounding said magnetic core and having its free ends extending through apertures in said upper pole of the magnetic core and connected in circuit with the resistance coils of said bridge which are positioned within the housing, said lower pole of the magnetic core being adapted to transmit changes in magnetic permeability of the tubing as it encounters corroded areas during the passage of the device through the tubing.

JOHN W. MILLINGTON.
WILLIAM H. STEWART.

REFERENCES CITED

The following references are of record in the file of this patent:

UNITED STATES PATENTS

| Number | Name | Date |
| --- | --- | --- |
| 1,324,818 | Hazard | Dec. 16, 1919 |
| 1,665,397 | Wunsch | Apr. 10, 1928 |
| 1,983,388 | Moore | Dec. 4, 1934 |
| 2,049,306 | Matson | July 28, 1936 |
| 2,194,229 | Johnston et al. | Mar. 19, 1940 |
| 2,250,703 | Crites et al. | July 29, 1941 |
| 2,359,894 | Brown et al. | Oct. 10, 1944 |

FOREIGN PATENTS

| Number | Country | Date |
| --- | --- | --- |
| 368,006 | Great Britain | Mar. 3, 1932 |